Patented May 30, 1939

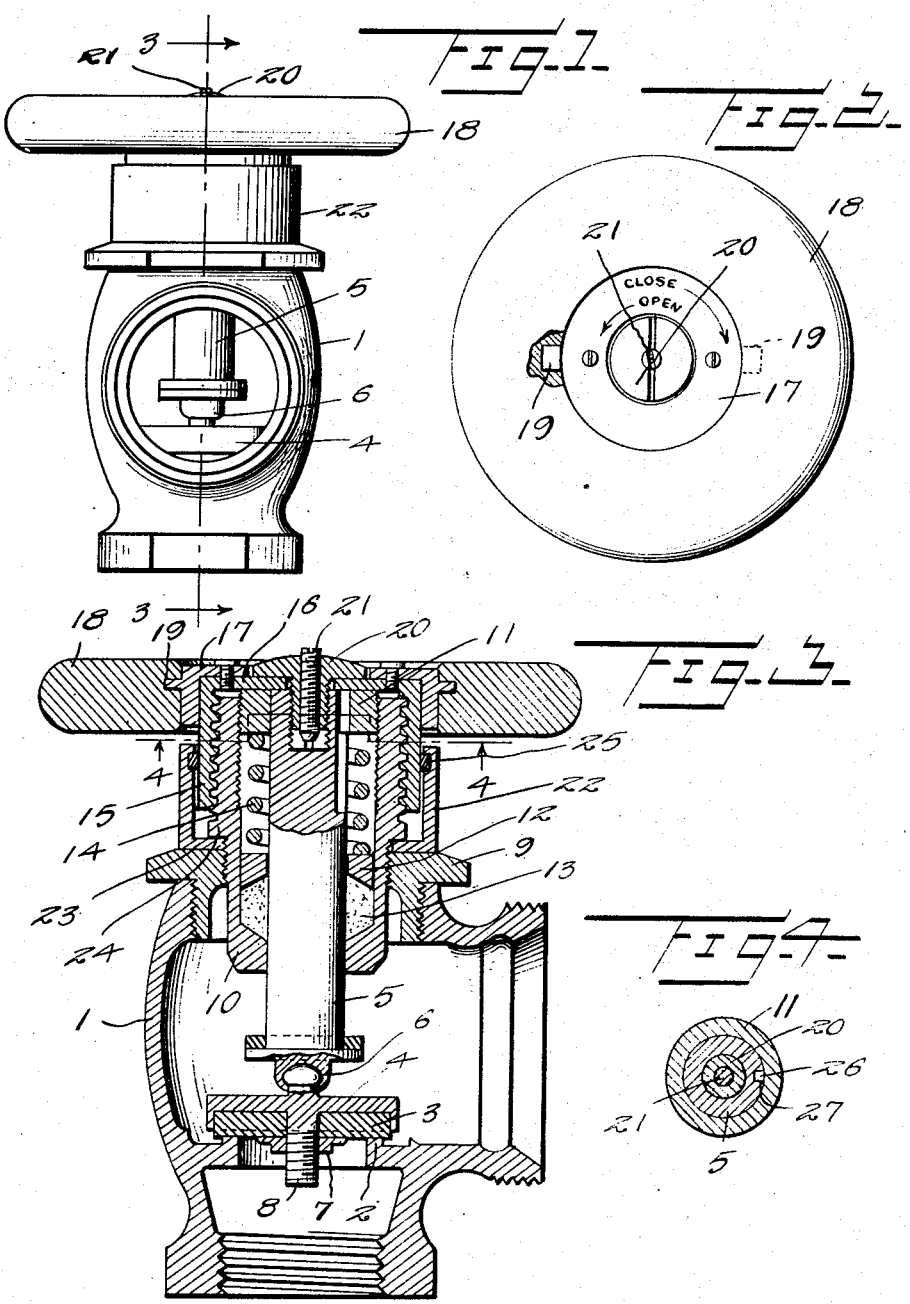

2,160,536

UNITED STATES PATENT OFFICE 2,160,536

STICKPROOF RADIATOR VALVE

Charles F. Buning, Dayton, Ohio

Application June 24, 1938, Serial No. 215,676

2 Claims. (Cl. 251—48)

This invention relates to valves primarily designed for radiators for steam and hot water heating systems, and its general object is to provide a valve that includes stem operating parts and related elements, which are suitably housed to retain the same free from rust and corrosion, as well as the passage of scale, grit, sediment, dirt, dust and other foreign matter thereto, with the result the valve is capable of performing its intended function for a prolonged period of time, without possibility of becoming stuck or locked.

An important object is to provide a valve that includes adjustable spring means for retaining the stem packing tight at all times, yet allows free movement of the stem for opening and closing the valve.

Another object is to provide a valve of the character set forth, that is simple in construction, inexpensive to manufacture, and extremely efficient in use, operation and service.

This invention also consists in certain other features of construction and in the combination and arrangements of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side view of the valve which forms the subject matter of the present invention.

Figure 2 is a top plan view thereof.

Figure 3 is a sectional view taken approximately on line 3—3 of Figure 1, looking in the direction of the arrows.

Figure 4 is a partial sectional view taken approximately on line 4—4 of Figure 3, looking in the direction of the arrows.

Referring to the drawing in detail the reference numeral 1 indicates the body of my valve and which includes the usual inlet and outlet threaded nipple members for connection to the supply pipe and radiator. Formed within the body is a partition having an opening therein provided with a seat 2, as shown, to receive the washer 3 of the head, the washer being preferably made from lead or other material suitable for the purpose, and is mounted in a cup-shaped disk 4 swiveled to the stem 5 by a ball and socket joint 6. The washer is held within the cup-shaped disk by a nut 7 threaded on a stud 8 formed on and depending centrally from the disk.

The upper end of the body is provided with the usual exteriorly threaded opening to receive the base section 9 of the bonnet of my valve and which is provided with a flange forming a shoulder mounted on the body, the flange being square cornered to facilitate the application and removal of the section 9 with respect to the body, as clearly shown in Figure 1. The other or inner section 10 of the bonnet is in the form of a sleeve threadedly mounted within the base section to extend below the lower end thereof, in the form as shown, and is provided with a restricted lower end forming a bearing for the stem 5 mounted for passage therethrough.

The sleeve section 10 is interiorly threaded from its upper end for a portion of its height to threadedly receive a packing nut 11 mounted on the stem which likewise has a gland 12 mounted thereon for engagement with packing 13 seated within the restricted portion of the section 10. Surrounding the stem and having its end convolutions engaging the packing nut 11 and gland 12 is a coil spring 14 for urging the gland against the packing, to provide a leak proof connection between the sleeve 10 and stem, as will be apparent.

The sleeve section 10 is exteriorly threaded from its upper end for a portion of its height to threadedly receive the skirt 15 of a cap 16 that has secured by screws or the like to the top thereof the horizontal flange of an annular attaching member for the handle 18 which is fixed to the vertical flange by lugs 19 embedded therein and extending from diametrically opposite sides of the vertical flange, as best shown in Figure 2.

The top of the cap 16 has a central opening therein for the passage of the shank of a headed screw 20 that is threaded in the upper end of the stem 5, and locked accordingly by a set screw 21, threaded into a bore extending through the head of the screw and into the shank thereof, the shank being split as shown and the bore is tapered inwardly at its lower portion, so that the set screw will spread the shank into binding engagement with the stem, thereby bringing about the locking action as will be apparent. It will be noted from Figure 3 that the top of the cap is disposed between the head of the screw 20 and the upper end of the stem for swively connecting the cap with respect to the stem.

From the foregoing it will be seen that upon rotation of the handle in an anti-clockwise direction, the stem will be raised to open the valve and lowered to close the valve when the handle is rotated in a clockwise direction, as the pressure of the cap is against the screw head to raise the stem and against the top of the latter to lower the same.

Surrounding the skirt 15 of the cap 16, is the collar portion 22 of a dust cap or housing that includes an inwardly directed annular flange 23 seated upon the base section 9 and held accordingly by an annular shoulder 24 formed on the sleeve section 10. The collar portion 22 has a gasket 25 of asbestos or other material suitable for the purpose, mounted in an annular groove in the inner face thereof for engagement with the skirt 15, as clearly shown in Figure 3, and that feature together with the arrangement of the stem actuating means with respect to the bonnet retains the parts free from corrosion, rust, dirt, dust and other foreign matter so that operation of the valve for a prolonged period of time is assured, without possibility of sticking or locking.

The pressure of the coil spring 14 can be readily adjusted through the medium of the packing nut 11, merely by rotating the screw 20 by a tool or the like inserted in the kerf thereof, as the packing nut has a key or tongue 26 formed thereon and mounted for slidable movement in a groove 27 extending longitudinally of the stem, as shown in Figures 3 and 4.

The attaching member 17 preferably has indicia and arrows arranged thereon to indicate the direction of rotation of the handle to open and close the valve, as clearly shown in Figure 2.

The socket member of the ball and socket joint 6 is preferably formed on a disk member 28 fixed to the lower end of the stem 5 and which is of greater diameter than the stem to provide a shoulder having mounted thereon a gasket 29 of lead or other material suitable for the purpose for engagement with the lower end of the sleeve section 10 of the bonnet, when the valve is fully opened, as will be apparent upon inspection of Figure 3.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A valve comprising a body including an inlet and an outlet, a partition between the inlet and outlet and having an opening formed with a seat, a bonnet secured to the body and rising therefrom, a stem slidably mounted through the bonnet and extending into the body, a head swiveled on the stem and engageable with the seat, a cap including a skirt threaded on the outer portion of the bonnet, means mounted in the upper end of the stem and swivelly connecting the cap thereto, handle means secured to the cap for moving the head to open and closed position through the medium of the stem, packing between the stem and bonnet to provide a leak proof connection therefor, a packing nut threaded to the bonnet and interiorly thereof, a gland for the packing, a spring between the nut and gland for urging the latter against the packing, and means of connection between the nut and stem for adjusting the spring upon rotation of the stem.

2. A valve comprising a body including an inlet and an outlet, a partition between the inlet and outlet and having an opening formed with a seat, a bonnet secured to and rising from the body, a stem slidably mounted through the bonnet and extending into the body, a head swiveled on the lower end of the stem and engageable with the seat, a cap including a skirt threaded on the outer portion of the bonnet, dust proof housing means surrounding the skirt and secured to the bonnet, headed means threaded in the upper end of the stem and swivelly connecting the cap thereto, locking means for said headed means, handle means secured to the cap for moving said head to open and closed position through the medium of the stem, packing between the stem and bonnet to provide a leak proof connection therefor, a packing nut interiorly threaded to the bonnet, a gland for the packing, a coil spring sleeved to the stem between the nut and gland for urging the latter against the packing, said stem having a groove extending longitudinally thereof, and a tongue on the nut and mounted in the groove for adjusting the spring upon rotation of the stem.

CHARLES F. BUNING.